(12) United States Patent
Kim et al.

(10) Patent No.: US 12,496,320 B2
(45) Date of Patent: Dec. 16, 2025

(54) LACTOBACILLUS SP. STRAIN AND USE THEREOF

(71) Applicant: LG HOUSEHOLD & HEALTH CARE LTD., Seoul (KR)

(72) Inventors: Young-Ok Kim, Busan (KR); Dong-Gyun Kim, Busan (KR); Bong Seok Kim, Busan (KR); Bo-Hye Nam, Busan (KR); Hee Jeong Kong, Busan (KR); Seung Jin Hwang, Seoul (KR); Byung Hyun Kim, Seoul (KR); Mu hyun Jin, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 361 days.

(21) Appl. No.: 18/032,893

(22) PCT Filed: Oct. 14, 2021

(86) PCT No.: PCT/KR2021/014161
§ 371 (c)(1),
(2) Date: Apr. 20, 2023

(87) PCT Pub. No.: WO2022/086041
PCT Pub. Date: Apr. 28, 2022

(65) Prior Publication Data
US 2024/0269200 A1 Aug. 15, 2024

(30) Foreign Application Priority Data
Oct. 21, 2020 (KR) .......................... 10-2020-0136518

(51) Int. Cl.
| | |
|---|---|
| *A61K 35/747* | (2015.01) |
| *A01N 63/20* | (2020.01) |
| *A01P 1/00* | (2006.01) |
| *A23K 10/18* | (2016.01) |
| *A23K 50/80* | (2016.01) |
| *A61K 8/99* | (2017.01) |
| *A61P 31/04* | (2006.01) |
| *A61Q 19/00* | (2006.01) |
| *A61Q 19/08* | (2006.01) |
| *C12N 1/20* | (2006.01) |
| *C12R 1/225* | (2006.01) |

(52) U.S. Cl.
CPC ............ *A61K 35/747* (2013.01); *A01N 63/20* (2020.01); *A01P 1/00* (2021.08); *A23K 10/18* (2016.05); *A23K 50/80* (2016.05); *A61K 8/99* (2013.01); *A61P 31/04* (2018.01); *A61Q 19/00* (2013.01); *A61Q 19/007* (2013.01); *A61Q 19/08* (2013.01); *C12N 1/20* (2013.01); *C12R 2001/225* (2021.05)

(58) Field of Classification Search
CPC ...................................................... A61K 35/747
See application file for complete search history.

(56) References Cited

U.S. PATENT DOCUMENTS

2016/0051601 A1   2/2016   Rios et al.

FOREIGN PATENT DOCUMENTS

| | | | |
|---|---|---|---|
| KR | 10-2014-0039548 | A | 4/2014 |
| KR | 10-1503979 | B1 | 3/2015 |
| KR | 10-2016-0140833 | A | 12/2015 |
| KR | 10-2016-0046834 | A | 4/2016 |
| KR | 10-1796494 | B1 | 11/2017 |
| KR | 10-1915463 | B1 | 11/2018 |
| KR | 10-1930342 | B1 | 12/2018 |
| KR | 10-2125316 | B1 | 6/2020 |
| KR | 10-2244492 | B1 | 4/2021 |
| WO | WO 2015/022297 | A1 | 2/2015 |

OTHER PUBLICATIONS

International Search Report (PCT/ISA/210), issued in PCT/KR2021/014161, dated Feb. 14, 2022.

*Primary Examiner* — Albert M Navarro
(74) *Attorney, Agent, or Firm* — Birch, Stewart, Kolasch & Birch, LLP

(57) ABSTRACT

The present invention provides a novel *Lactobacillus* sp. strain, which has high antibacterial activity against various pathogenic bacteria, including bacteria associated with fish diseases and dental cavities, inhibits the production of melanin and promotes the synthesis of collagen, and thus can be utilized as a material for a variety of foods and medicines, and the use thereof.

10 Claims, 8 Drawing Sheets

Specification includes a Sequence Listing.

[FIG. 1]
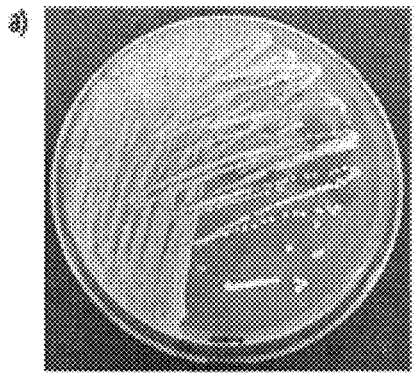
Lactobacillus pentosus
b) [DNA sequence] (SEQ. ID. NO.:1)
[FIG. 2]
| bacteria associated with fish disease ||||| bacteria associated with dental cavities |
|---|---|---|---|---|---|
| V. harveyi KCCM 40866 | S. iniae FP5228 | E. tarda | S. parauberis KCTC 3651 | V. anguillarum | S. mutans KCTC 3065 |
| ○ | × | ○ | ○ | ○ | ○ |

[FIG. 3]
| | E. coli ATCC 8739 | P. aeruginosa ATCC 15522 | S. aureus ATCC 6538 |
|---|---|---|---|
| Lactobacillus pentosus | 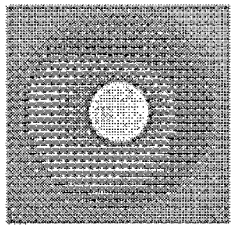 | 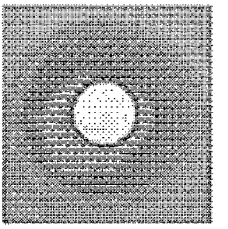 | 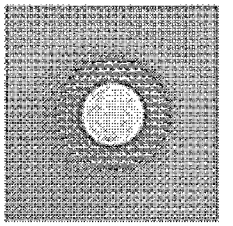 |

[FIG. 4]
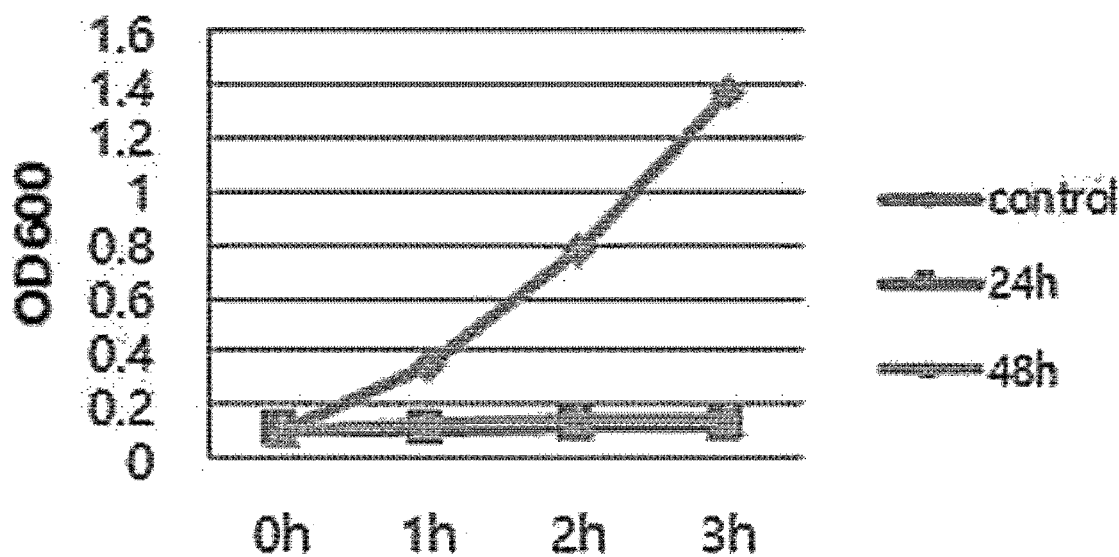
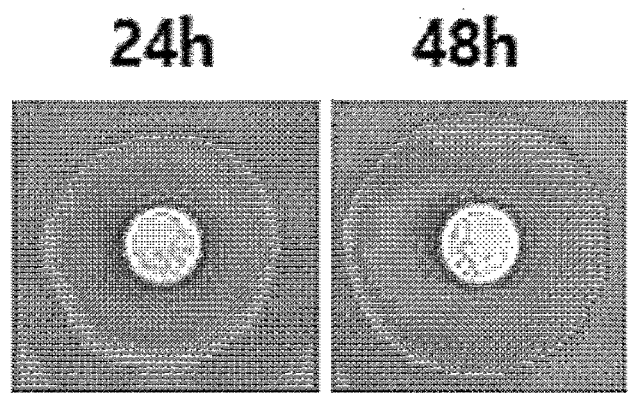

[FIG. 5]
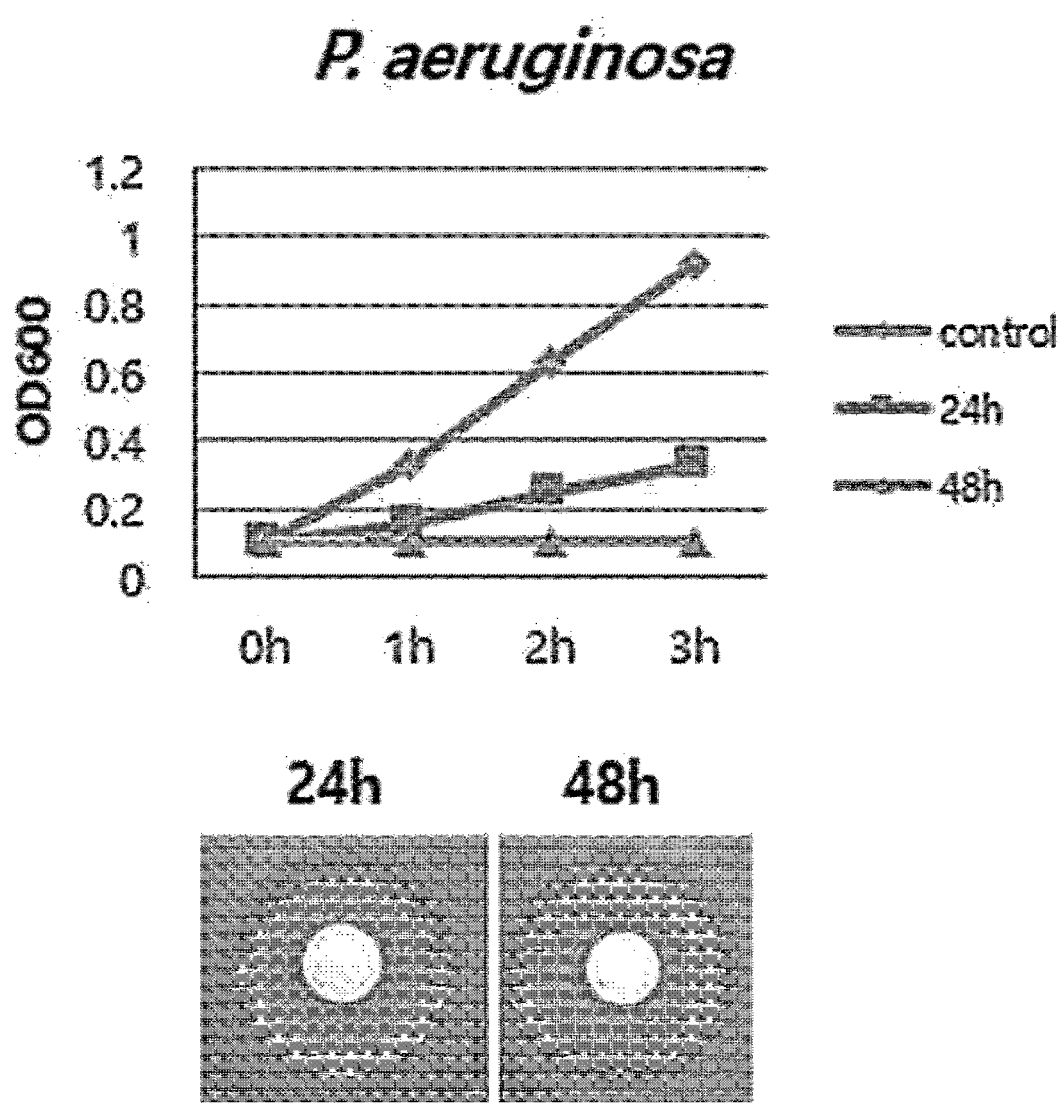

[FIG. 6]
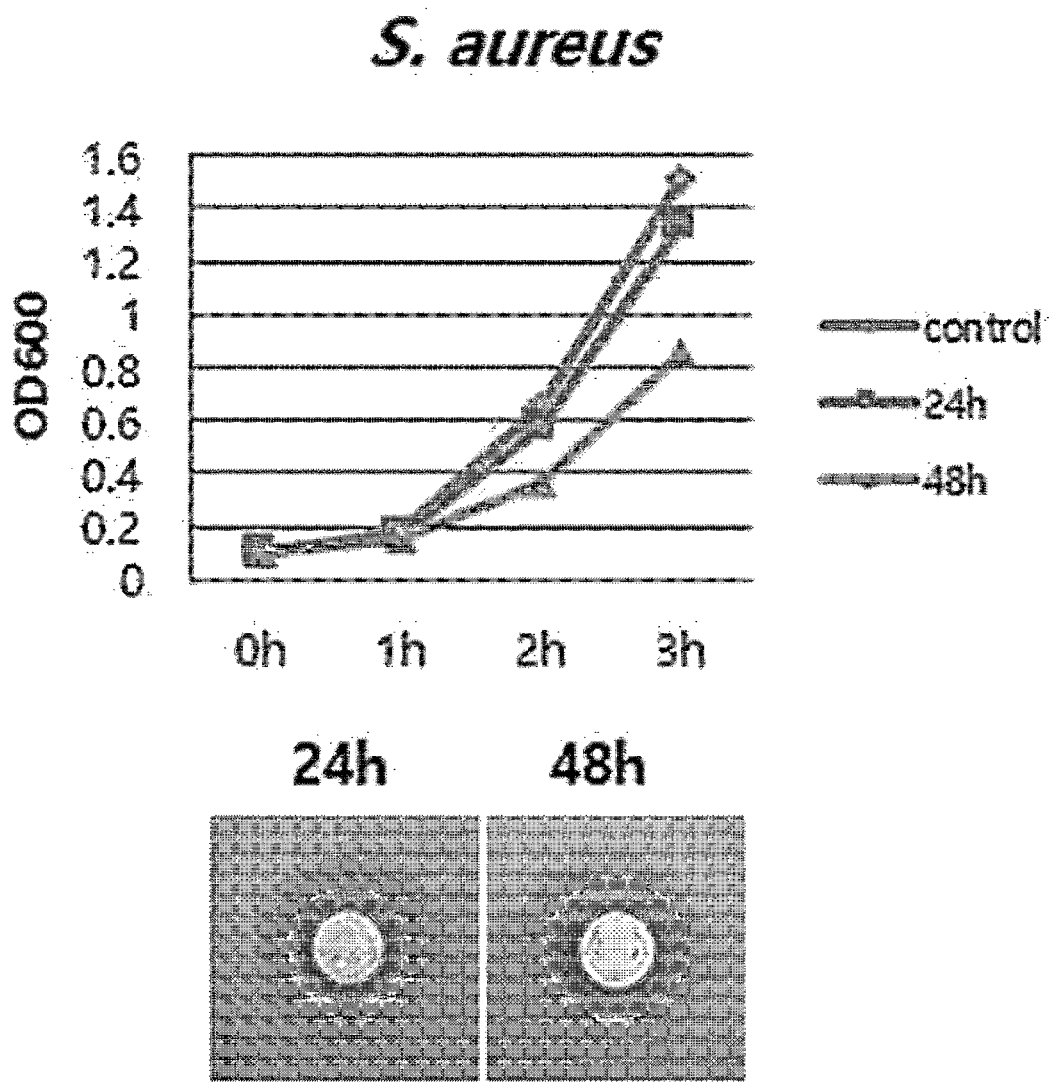

[FIG. 7]
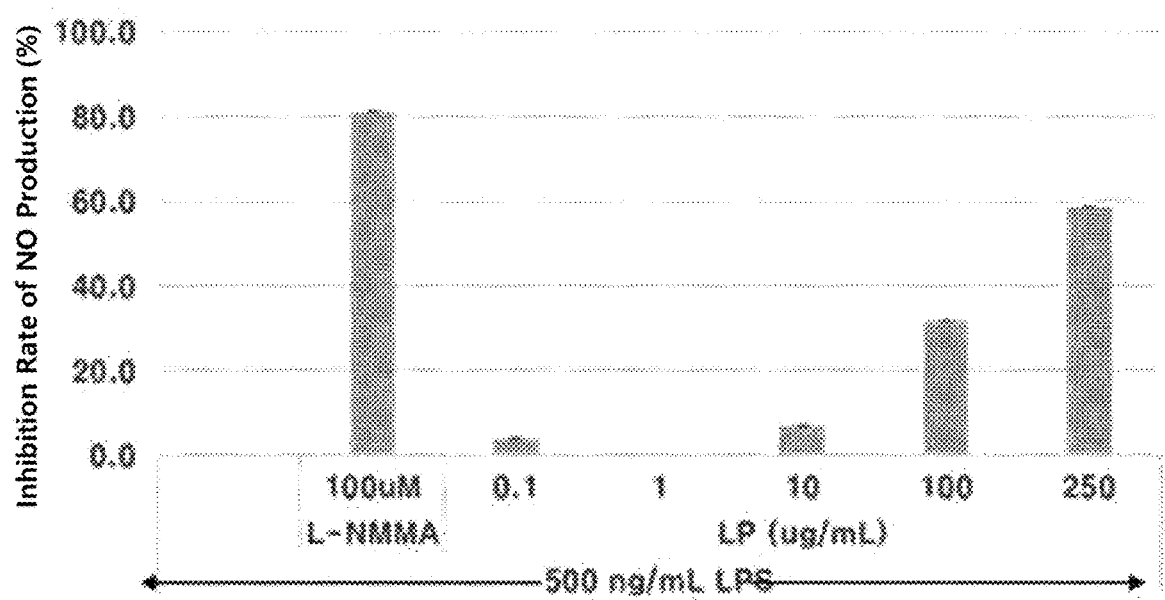

[FIG. 8]
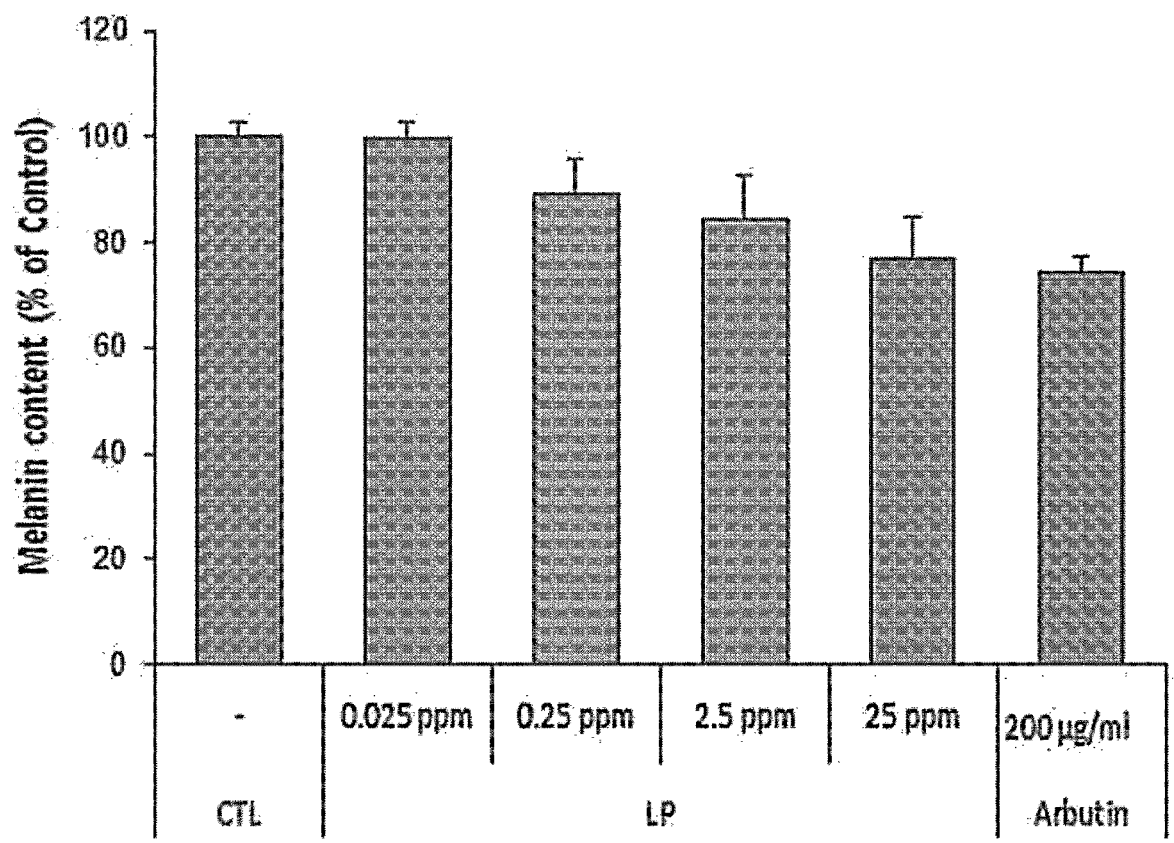

[FIG. 9]
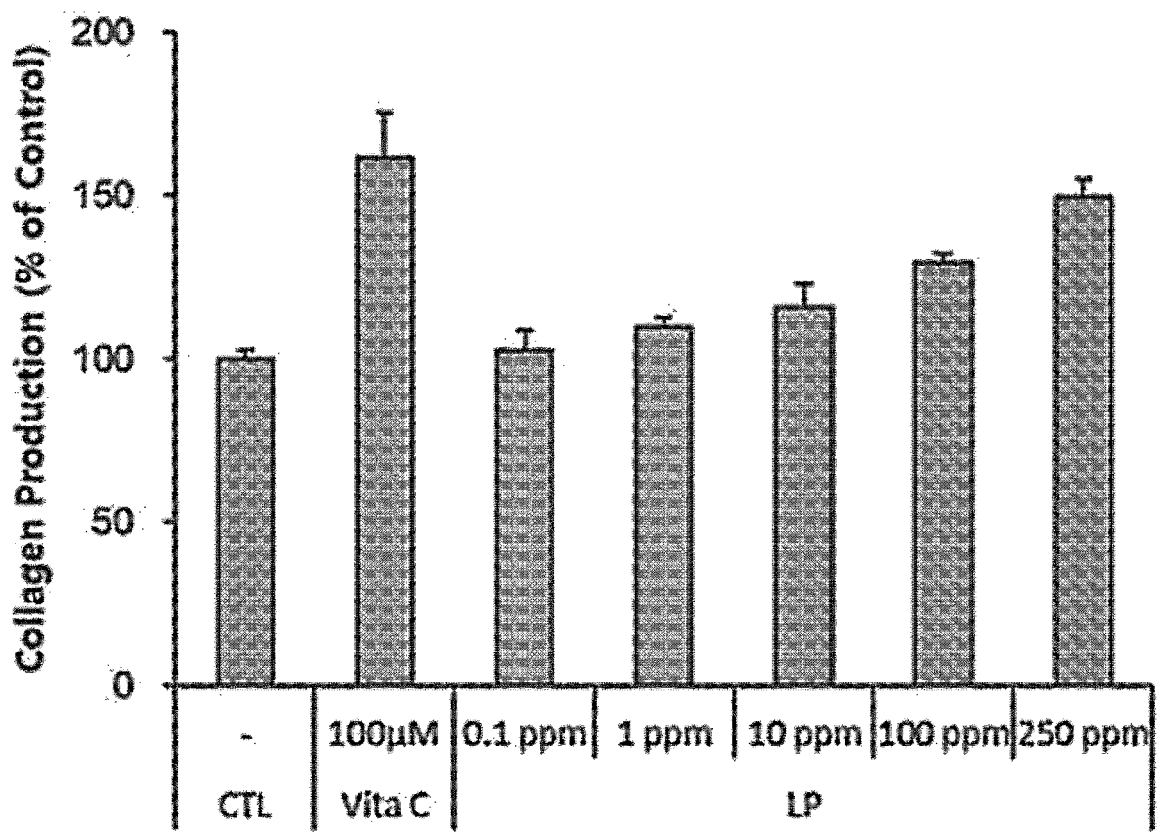

SEQUENCE LISTING

```
<160> NUMBER OF SEQ ID NOS: 1

<210> SEQ ID NO 1
<211> LENGTH: 1167
<212> TYPE: DNA
<213> ORGANISM: Artificial Sequence
<220> FEATURE:
<223> OTHER INFORMATION: 16S rDNA
```

```
<400> SEQUENCE: 1
ctgctcagac gacgctgcgg cgtgctaata catgcaagtc gaacgaactc tggtattgat      60
tggtgcttgc atcatgattt acatttgagt gagtggcgaa ctggtgagta acacgtggga     120
aacctgccca gaagcggggg ataacacctg gaaacagatg ctaataccgc ataacaactt     180
ggaccgcatg gtccgagctt gaaagatggc ttcggctatc acttttggat ggtcccgcgg     240
cgtattagct agatggtggg gtaacggctc accatggcaa tgatacgtag ccgacctgag     300
agggtaatcg gccacattgg gactgagaca cggcccaaac tcctacggga ggcagcagta     360
gggaatcttc cacaatggac gaaagtctga tggagcaacg ccgcgtgagt gaagaagggt     420
ttcggctcgt aaaactctgt tgttaaagaa gaacatatct gagagtaact gttcaggtat     480
tgacggtatt taaccagaaa gccacggcta actacgtgcc agcagccgcg gtaatacgta     540
ggtggcaagc gttgtccgga tttattgggc gtaaagcgag cgcaggcggt tttttaagtc     600
tgatgtgaaa gccttcggct caaccgaaga agtgcatcgg aaactgggaa acttgagtgc     660
agaagaggac agtggaactc catgtgtagc ggtgaaatgc gtagatatat ggaagaacac     720
cagtggcgaa ggcggctgtc tggtctgtaa ctgacgctga ggctcgaaag tatgggtagc     780
aaacaggatt agataccctg gtagtccata ccgtaaacga tgaatgctaa gtgttggagg     840
gtttccgccc ttcagtgctg cagctaacgc attaagcatt ccgcctgggg agtacggccg     900
caaggctgaa actcaaagga attgacgggg gcccgcacaa gcggtggagc atgtggttta     960
attcgaagct acgcgaagaa ccttaccagg tcttgacata ctatgcaaat ctaagagatt    1020
agacgttccc ttcggggaca tggatacagg tggtgcatgg ttgtcgtcag ctcgtgtcgt    1080
gagatgttgg gttaagtccc gcaacgagcg caacccttat tatcagttgc cagcattaag    1140
ttgggcactc tggtgagact gccggtg                                        1167
```

LACTOBACILLUS SP. STRAIN AND USE THEREOF

REFERENCE TO SEQUENCE LISTING SUBMITTED VIA EFS-WEB

This application is being filed electronically via EFS-Web and includes an electronically submitted sequence listing in .txt format. The .txt file contains a sequence listing entitled "4698-0129PUS1_ST25.txt" created on Oct. 10, 2023 and is 2,047 bytes in size. The sequence listing contained in this .txt file is part of the specification and is hereby incorporated by reference herein in its entirety.

TECHNICAL FIELD

The present invention relates to a novel *Lactobacillus* sp. strain, and more specifically, the present invention relates to a novel *Lactobacillus* sp. strain and use thereof.

BACKGROUND ART

Probiotics, live bacterial preparations, play a role in preventing the settlement of harmful bacteria since the live bacteria, which are administrated to humans and animals, are concentrated and settled down on the wall of the digestive tract in the intestine, and also prevent the growth of harmful bacteria by lowering the pH of the intestine through the production of lactic acids. In addition, the administrated probiotics produce bacteriocins or peroxides to inhibit the proliferation of pathogens, and promotes the activity of intestinal villi, which serve to absorb nutrients. Furthermore, probiotics produce substances which are helpful for the absorption and utilization of nutrients, improve feed conversion ratio, and also produce substances that neutralize toxins caused by the pathogens. Probiotics are commonly used to suppress the reduction of beneficial bacteria in the digestive tract of animals or fish caused by stress, and prevent the settlement of pathogens by adhering to the wall of bacteria-free digestive tract before the pathogens do, after oral administration of antibiotic products. In this regard, kimchi, as a representative traditional fermented food, is known for its various functions of antioxidant, anti-aging, anti-obesity, anti-inflammatory, antibacterial, anti-allergy, and immune-enhancing effects, etc., and the efficacy of kimchi in vivo is derived from nutritional components and metabolites of fermented lactic acid bacteria. Lactic acid bacteria present in kimchi include *Lactobacillus* sp., *Leuconostoc* sp., and *Pediococcus* sp., which are mainly involved in the fermentation and nutrient production of kimchi, and various health functional foods prepared using lactic acid bacteria isolated from kimchi of probiotics are on the market.

Meanwhile, interests in brightening cosmetics and wrinkle-improving cosmetics have led to an increase in demand for brightening and wrinkle-improving materials and the development of cosmetics using microorganisms such as enzymes, lactic acid bacteria, etc., and in particular, it has been reported that the *Lactobacillus* strains used as a major microorganism have antibacterial activity, antioxidant activity, and anti-inflammatory activity. In this regard, Korean Patent No. 1503979 discloses a skin-brightening composition having culture fluid of the *Lactobacillus pentosus* strain, and a preparation method of the same.

DISCLOSURE

Technical Problem

The present inventors have found a novel *Lactobacillus* sp. strain that has high antibacterial activity against various pathogenic bacteria, including bacteria associated with fish diseases and dental cavities, inhibits the production of melanin and promotes the synthesis of collagen, and thus can be utilized as a material for a variety of foods and medicines, thereby completing the present invention.

Technical Solution

However, in the case of the prior art, as a study on the brightening effect of the strain, research on the antibacterial activity along with the brightening effect has not yet been reported.

The present invention has been implemented to solve various problems including the problems described above. Accordingly, one object of the present invention is to provide a novel *Lactobacillus* sp. strain that has high antibacterial activity against various pathogenic bacteria, including bacteria associated with fish diseases and dental cavities, inhibits the production of melanin and promotes the synthesis of collagen, and use thereof. However, these problems are given for illustrative purposes, and the scope of the present invention is not intended to be limited to or by these problems.

According to one aspect of the present invention, there is provided a *Lactobacillus pentosus* NIFSLG-1 strain deposited with Accession No. KCCM12780P.

According to another aspect of the present invention, there is provided a probiotic formulation including the strain as an active ingredient.

According to still another aspect of the present invention, there is provided a prebiotic formulation which promotes the proliferation of *Staphylococcus epidermidis*, a beneficial skin bacterium, including the strain as an active ingredient.

According to still another aspect of the present invention, there is provided a prebiotic formulation which inhibits the proliferation of *Staphylococcus aureus*, a harmful skin bacterium, including the strain as an active ingredient.

According to still another aspect of the present invention, there is provided a feed additive for fish farming, including the strain as an active ingredient.

According to still another aspect of the present invention, there is provided a feed for fish farming, including the feed additive.

According to still another aspect of the present invention, there is provided an antibacterial composition containing the strain, a lysate of the strain, or a culture supernatant of the strain, as an active ingredient.

According to still another aspect of the present invention, there is provided a composition for preventing tooth decay containing a lysate of the strain or a culture supernatant of the strain, as an active ingredient According to still another aspect of the present invention, there is provided a cosmetic composition containing a lysate of the strain or a culture supernatant of the strain, as an active ingredient.

According to still another aspect of the present invention, there is provided an antibacterial use of an antibacterial composition containing the strain, a lysate of the strain or a culture supernatant of the strain, as an active ingredient.

According to still another aspect of the present invention, there is provided a use for preventing tooth decay of a composition for preventing tooth decay containing a lysate of the strain or a culture supernatant of the strain, as an active ingredient.

According to still another aspect of the present invention, there is provided a use for improving skin conditions of a cosmetic composition containing a lysate of the strain or a culture supernatant of the strain, as an active ingredient.

According to still another aspect of the present invention, there is provided a method for preventing tooth decay, including administering a lysate of the strain or a culture supernatant of the strain to a subject.

According to still another aspect of the present invention, there is provided a method for improving skin conditions, including applying a lysate of the strain or a culture supernatant of the strain to the skin of a subject.

Advantageous Effects

The novel *Lactobacillus* sp. strain of the present invention as described above is non-toxic, exhibits excellent antibacterial activity against various pathogenic bacteria, inhibits the production of melanin, and promotes the synthesis of collagen, and thus, it can be utilized as a material for a variety of high industrially acceptable foods and medicines. However, the scope of the present invention is not intended to be limited to or by these effects.

BRIEF DESCRIPTION OF DRAWINGS

FIG. 1 is a photograph (a) and 16SrDNA analysis results (b) (SEQ ID NO: 1) of the *Lactobacillus pentosus* NIFSLG-1 strain of the present invention.

FIG. 2 is a diagram showing the antibacterial activity of the *Lactobacillus pentosus* NIFSLG-1 strain of the present invention.

FIG. 3 is a diagram showing the antibacterial activity of the *Lactobacillus pentosus* NIFSLG-1 strain of the present invention against skin harmful bacteria on the skin.

FIG. 4 is a graph and a photograph showing the analysis results of the antibacterial activity of the *Lactobacillus pentosus* NIFSLG-1 strain of the present invention against *E. coli*.

FIG. 5 is a graph and a photograph showing the analysis results of the antibacterial activity of the *Lactobacillus pentosus* NIFSLG-1 strain of the present invention against *P. aeruginosa*.

FIG. 6 is a graph and a photograph showing the analysis results of the antibacterial activity of the *Lactobacillus pentosus* NIFSLG-1 strain of the present invention against *S. aureus*.

FIG. 7 is a graph analyzing the results of the inhibition of NO production according to the treatment of the *Lactobacillus pentosus* NIFSLG-1 strain of the present invention in mouse macrophages.

FIG. 8 is a graph analyzing the results of the inhibition of melanin production according to the treatment of the *Lactobacillus pentosus* NIFSLG-1 strain of the present invention in MNT-1 melanoma cells.

FIG. 9 is a graph analyzing the results of collagen synthesis according to the treatment of the *Lactobacillus pentosus* NIFSLG-1 strain of the present invention in skin fibroblasts.

DETAILED DESCRIPTION OF PREFERRED EMBODIMENTS

Hereinafter, the present invention will be described in detail. Meanwhile, each description and embodiment disclosed herein can be applied to other descriptions and embodiment, respectively. That is, all combinations of various elements disclosed herein fall within the scope of the present invention. Further, the scope of the present invention is not limited by the specific description described below.

Definition of Terms

As used herein, the term "*Lactobacillus* sp. strain" refers to a bacterium that produces a large amount of lactic acid by fermenting saccharides to obtain energy. *Lactobacillus* is morphologically a gram-positive, spore-free bacilli and exhibits polymorphism, and the size ranges from 0.5 to 0.9×1 to 11 μm, showing various types from short bacilli to enteric bacilli, and some species exist in Coryne forms. The arrangement of bacteria includes single *bacillus*, diplo bacilli, strepto bacilli, and cocco *bacillus*, and most of them are non-motile and usually catalase-negative. The strain of the present invention prefers to grow in a low-oxygen environment and produces lactic acid from various saccharides.

As used herein, the term "improvement of skin inflammation" refers to the inhibition of inflammation, and includes not only the reduction or alleviation of inflammation without toxicity, incompatibility, instability, irritation, allergic response to a reactive phenomenon that occurs in vivo, such as the local exudation of antibody, a plasma component containing chemical substances such as histamine, serotonin, etc., or a tissue fluid in the site of inflammation, the infiltration of leukocytes, or fibrous proliferation for recovery, when proinflammatory factors act in vivo, but also a skin soothing effect.

As used herein, the term "skin regeneration" refers to the process of recovery of skin tissue against damage to the skin or cells caused by skin external and internal causes. The damage caused by the external cause may include ultraviolet rays, external contaminants, wound, trauma, and the damage caused by the internal cause may be stress, etc.

DETAILED DESCRIPTION OF THE INVENTION

According to one aspect of the present invention, there is provided a *Lactobacillus pentosus* NIFSLG-1 strain deposited with Accession No. KCCM12780P.

The strain may have antibacterial and probiotic activity, and may have antibacterial activity against bacteria selected from the group consisting of *Edwardsiella tarda, Streptococcus iniae, Vibrio anguillarum, Vibrio harveyi, Streptococcus parauberis, Streptococcus mutans, Escherichia coli, Pseudomonas aeruginosa*, and *Staphylococcus aureus*.

According to another aspect of the present invention, there is provided a probiotic formulation including the strain as an active ingredient.

According to still another aspect of the present invention, there is provided a prebiotic formulation which promotes the proliferation of *Staphylococcus epidermidis*, a beneficial skin bacterium, including the strain as an active ingredient.

According to still another aspect of the present invention, there is provided a prebiotic formulation which inhibits the proliferation of *Staphylococcus aureus*, a harmful skin bacterium, including the strain as an active ingredient.

According to still another aspect of the present invention, there is provided a feed additive for fish farming, including the strain as an active ingredient.

According to still another aspect of the present invention, there is provided a feed for fish farming, including the feed additive.

According to still another aspect of the present invention, there is provided an antibacterial composition containing the strain, a lysate of the strain, or a culture supernatant of the strain, as an active ingredient.

According to still another aspect of the present invention, there is provided a composition for preventing tooth decay containing a lysate of the strain or a culture supernatant of the strain, as an active ingredient According to still another aspect of the present invention, there is provided a cosmetic composition containing a lysate of the strain or a culture supernatant of the strain, as an active ingredient.

The cosmetic composition may have any one of the effects of improving skin conditions selected from promoting skin collagen synthesis, improving skin wrinkles, alleviating skin inflammation, promoting skin brightening, promoting skin regeneration, improving skin elasticity, calming skin, improving skin moisturization, promoting proliferation of beneficial bacteria on the skin, and inhibiting proliferation of harmful bacteria on the skin, and it may have a formulation selected from the group consisting of solution, suspension, emulsion, paste, gel, cream, lotion, powder, soap, surfactant-containing cleanser, oil, powder foundation, emulsion foundation, wax foundation, spray, and a mixture thereof.

In the cosmetic composition, a lysate of the strain, a culture solution of the strain, or a supernatant of the culture solution of the strain may be used, and a filtrate or non-filtrate thereof, or an extract thereof may be used. The extract may be those isolated and obtained using extraction and isolation methods known in the art. In particular, as a suitable solvent that can be used to obtain the extract, any solvent acceptable in the art may be used, and water or an organic solvent may be used. For example, various solvents such as purified water, alcohols having 1 to 4 carbon atoms such as methanol, ethanol, propanol, isopropanol, butanol, etc., acetone, ether, benzene, chloroform, ethyl acetate, methylene chloride, hexane, and cyclohexane may be used alone or in combination, but the solvent may not be limited thereto. As the extraction method, any one of methods such as hot water extraction, cold extraction, reflux cooling extraction, solvent extraction, steam distillation, ultrasonic extraction, elution, and compression may be selected and used. In addition, the desired extract may be further subjected to a conventional fractionation process and may be purified using a conventional purification method.

The composition of the present invention may be injected into a tank where fish live, or administered through oral administration to infected fish or local administration to an affected area. The pharmaceutically effective amount of the composition may vary depending on the type of fish infected, the age of the fish, and the degree of symptoms, but the pharmaceutically effective amount may be about 1 to 2000 ppm, 10 to 1000 ppm, and 50 to 500 ppm when the composition is directly treated to a tank, and it may be about 1 to 2000 mg/kg, 10 to 1000 mg/kg, and 50 to 500 mg/kg when the composition is administered to infected fish.

The composition of the present invention may include a pharmaceutically acceptable carrier. The composition including a pharmaceutically acceptable carrier may be in the form of various oral or parenteral formulations, but may preferably be a parenteral formulation. The composition is formulated using conventional diluents or excipients, including fillers, extenders, binders, wetting agents, disintegrants, surfactants, etc. Solid formulations for oral administration include tablets, pills, powders, granules, capsules, etc., and these solid formulations may be prepared by mixing at least one compound with one or more excipients, for example, starch, calcium carbonate, sucrose, lactose, gelatin, etc. In addition to simple excipients, lubricants such as magnesium stearate, talc, etc. may also be used. Additionally, liquid formulations for oral administration include suspensions, solutions for internal use, emulsions, syrups, etc. In addition to water, commonly used as a simple diluent, and liquid paraffin, various excipients, for example, wetting agents, sweetening agents, flavors, preservatives, etc. may be included. Formulations for parenteral administration include sterilized aqueous solutions, non-aqueous solvents, suspensions, emulsions, freeze-drying agents, suppositories, etc. Propylene glycol, polyethylene glycol, vegetable oils such as olive oil, injectable esters such as ethyl oleate, etc. may be used as non-aqueous solvents and suspensions. Bases for suppositories may include witepsol, macrogol, tween 61, cacao butter, laurin butter, glycerinated gelatin, etc.

The feed additive according to one embodiment of the present invention may include, in addition to the above-described active ingredients, additives such as known carriers or stabilizers which are pharmaceutically or sitologically acceptable or acceptable for feed. Additionally, if necessary, various nutrients such as, vitamins, amino acids, minerals, etc., antioxidants, antibiotics, antibacterial agents, and other additives may be added to the feed additive of the present invention, and the feed additive may be prepared in a suitable form such as powder, granule, pellet, suspension, etc. In the case of supplying the feed additive of the present invention, the feed additive can be supplied alone or in combination with feed for fish or crustaceans.

Examples of fish, which is a subject of the present invention, may preferably include a marine fish such as sea bream, *Paralichythys olivaceus, Sebastes schelegeli, Pagrus major, Miichthys miiuy, Mugil cephalus, Epinephelus septemfasciatus*, etc., and land-based fish such as *Anguilla japonica, Plecoglossus altivelis, Oncorhynchus masou, Onchorhynchus mykiss, Siniperca scherzeri*, etc., and more preferably include sea bream, but the fish is not particularly limited thereto. Thus, it can be implied that the novel *Lactobacillus* sp. strain according to one embodiment of the present invention can be effectively utilized as probiotics for fish farming. Therefore, according to another aspect of the present invention, there is provided a probiotic formulation containing the novel *Lactobacillus* sp. strain. The probiotic formulation according to one embodiment of the present invention may include, in addition to the above-described active ingredients, known carriers or additives which are pharmaceutically or sitologically acceptable or acceptable for feed.

Further, according to still another aspect of the present invention, there is provided a feed for fish farming containing the *Lactobacillus* sp. strain. The novel *Lactobacillus* sp. strain according to one embodiment of the present invention, which is a Gram-positive bacterium having a sporulation capacity, is preferably formulated in a spore form, but not limited thereto. The feed for fish and/or crustacean farming according to one embodiment of the present invention may be provided in the form of a formulated feed by mixing with a main feed such as fish meal, seed meal, starch meal, soybean meal, and water flea, in addition to the novel *Lactobacillus* sp. strain. In addition, the formulation of the feed is not particularly limited, but any feed such as powder feed, solid feed, moist pellet feed, dry pellet feed, extruder pellet (EP) feed, raw feed, etc. may be used. In particular, the feed is preferably supplied in the same amount and feeding interval as the normal feed.

The cosmetic composition according to the present invention may exhibit any one of the effects of improving skin conditions selected from promoting skin collagen synthesis, improving skin wrinkles, alleviating skin inflammation, promoting skin brightening, promoting skin regeneration, improving skin elasticity, calming skin, improving skin moisturization, promoting proliferation of beneficial bacteria on the skin, and inhibiting proliferation of harmful bacteria on the skin.

The cosmetic composition according to the present invention may have a formulation selected from the group consisting of solution, suspension, emulsion, paste, gel, cream, lotion, powder, soap, surfactant-containing cleanser, oil, powder foundation, emulsion foundation, wax foundation, spray, and a mixture thereof, and may be prepared in any formulation conventionally prepared in the art, e.g., solution, suspension, emulsion, paste, gel, cream, lotion, powder, soap, surfactant-containing cleanser, oil, powder foundation, emulsion foundation, wax foundation, and spray, etc., but is not limited thereto. More specifically, when the composition of the present invention is used as a cosmetic composition, it may be prepared in formulations selected from the group consisting of basic cosmetics selected from cosmetic water, emulsion, cream, essence, gel, pack, and cleansing cream; and makeup cosmetic such as foundation, etc. When the formulation of the present invention is a paste, cream or gel, animal oil, vegetable oil, wax, paraffin, starch, tragacanth, cellulose derivatives, polyethylene glycol, silicone, bentonite, silica, talc, or zinc oxide, may be used as a carrier ingredient. In addition, when the formulation of the present invention is a powder or spray, lactose, talc, silica, aluminum hydroxide, calcium silicate, or polyamide powder may be used as a carrier ingredient, and in particular, when it is a spray, a propellant such as chlorofluorohydrocarbon, propane/butane or dimethyl ether may be additionally included.

According to still another aspect of the present invention, there is provided an antibacterial use of an antibacterial composition containing the strain, a lysate of the strain or a culture supernatant of the strain, as an active ingredient.

According to still another aspect of the present invention, there is provided a use for preventing tooth decay of a composition for preventing tooth decay containing a lysate of the strain or a culture supernatant of the strain, as an active ingredient.

According to still another aspect of the present invention, there is provided a use for improving skin conditions of a cosmetic composition containing a lysate of the strain or a culture supernatant of the strain, as an active ingredient.

According to still another aspect of the present invention, there is provided a method for preventing tooth decay, including administering a lysate of the strain or a culture supernatant of the strain to a subject.

According to still another aspect of the present invention, there is provided a method for improving skin conditions, including applying a lysate of the strain or a culture supernatant of the strain to the skin of a subject.

The subject includes mammals including mice, livestock, humans, etc., without limitation. In addition, humans may be excluded from the subject of the present invention, but the subject is not limited thereto.

The method of the present invention may include administering or applying a lysate of the strain or a culture supernatant of the strain in an effective amount. An appropriate total daily dose of the composition may be determined within the scope of correct medical judgment by a practitioner, and the composition may be administered once or several times in divided doses. However, for the purpose of the present invention, it is preferred that the specific therapeutically effective dose of the composition for any particular patient be applied differently depending on the kind and degree of responses to be achieved, specific compositions including whether other agents are occasionally used therewith, the patient's age, body weight, health conditions, sex and diet, administration time, administration route, excretion rate of the composition, duration of treatment, various factors including drugs used in combination or simultaneously with the specific compositions, and similar factors well known in the medical field.

MODE FOR CARRYING OUT THE INVENTION

Hereinafter, the present invention will be described in detail by way of Examples. The present invention is not limited to the Examples disclosed below, but can be embodied in mutually different various forms, and the Examples render the disclosure of the present invention complete and are provided to fully inform those skilled in the art of the scope of the present invention.

Example 1: Selection of Strains

In order to select strains for securing antibacterial substances, the samples taken by the present inventors from Dokdo seawater and sediment were spread on a *Lactobacillus* MRS agar plate (BD Difco, USA) and cultured at 22° C. for 48 hours, and 67 morphologically different strains were selected.

Then, the antibacterial activity against various pathogenic bacteria such as bacteria associated with fish diseases, skin diseases, and food poisoning was analyzed by paper disk method. Among them, a strain with excellent antibacterial activity was selected, and as a result of 16S rDNA analysis, the selected strain was named *Lactobacillus pentosus* NIFSLG-1 (FIG. 1).

Example 2: Analysis of Antibacterial Activity

According to one embodiment of the present invention, the antibacterial activity of the selected *Lactobacillus pentosus* NIFSLG-1 strain was analyzed. Specifically, *Edwardsiella tarda, Streptococcus iniae, Vibrio anguillarum, Vibrio harveyi*, and *Streptococcus parauberis*, which are fish pathogenic microorganisms, were cultured in a medium suitable for growth. Thereafter, the fish pathogenic microorganisms were spread on an agar medium containing the medium, and then a paper disc having a diameter of 0.8 cm was placed thereon. The *Lactobacillus pentosus* NIFSLG-1 strain of the present invention was cultured at 22° C. for 48 hours, and subsequently, about 50 µL of the 10-fold concentrated culture supernatant was obtained through centrifugation and was dropped above the paper disc, and the size of the formed transparent ring was measured.

As a result, the *Lactobacillus pentosus* NIFSLG-1 strain of the present invention showed strong antibacterial activity against *E. tarda, S. parauberis, V. harveyi* and *V. anguil-*

*larum*, and also showed antibacterial activity against *S. mutans*, a bacterium associated with dental cavities (FIG. 2).

Example 3: Analysis of Antibacterial Activity Against Harmful Skin Bacteria

For the analysis of antibacterial activity against skin harmful bacteria, 1% of the *Lactobacillus pentosus* NIFSLG-1 strain was re-inoculated and cultured in a MRS medium for 24 hours and 48 hours, and then centrifuged to obtain the supernatant. Thereafter, the antibacterial effect on *E. coli*, *P. aeruginosa*, and *S. aureus*, which are standard evaluation strains for cosmetics, was analyzed by culturing the strain for 24 and 48 hours and using a liquid culture method and a paper disc method. As a result, the strain showed activity against all three bacteria (FIG. 3), and it was confirmed that the antibacterial activity was excellent, especially when cultured for 48 hours (FIGS. 4 to 6).

Example 4: Evaluation of Hyaluronic Acid Synthesis Ability

The moisturizing effect of the *Lactobacillus pentosus* NIFSLG-1 strain of the present invention was evaluated. Specifically, the moisturizing effect was evaluated by confirming the total amount of hyaluronic acid (HA) of the sample using human keratinocytes (HaCaT). First, HaCaT cells were dispensed in a 96-well culture plate at $1\times10^4$ cells/well and cultured for 24 hours in a DMEM medium containing 10% fetal bovine serum (FBS). Then, the sample was diluted to a final concentration of 10 µg/mL in a medium without 10% FBS, and after treating the cells with the sample for 24 hours, the supernatant was recovered and the HA content was measured with a Hyaluronan Quantikine ELISA Kit (DHYAL0, R&D systems). The HA concentration of each well was corrected with the result value (number of cells) measured by CCK-8 assay. The moisturizing effect was evaluated by the relative HA concentration (%) of the experimental group, which was treated with the sample, compared to the untreated group. As a result, the *Lactobacillus pentosus* lysate treatment of the present invention showed a 144% HA synthesis rate compared to the untreated group at 10 ppm (see Table 1). The evaluation result of the moisturizing effect is summarized in Table 1 below.

TABLE 1

Evaluation of Moisturizing Effect

| Sample | Treatment Concentration (µg/mL) | Relative HA Concentration (%) |
|---|---|---|
| *Lactobacillus pentosus* lysate | 10 | 144 |

Example 5: Evaluation of Prebiotics

The ability of enhancing beneficial skin bacteria/inhibiting harmful skin bacteria of the *Lactobacillus pentosus* NIFSLG-1 strain of the present invention was evaluated. Specifically, a sterile liquid medium was prepared using a commercially available tryptic soy broth (TSB) medium, and a glycerol preservative solution of *S. epidermidis*, a beneficial bacterium, or *S. aureus*, a harmful bacterium, was inoculated into the sterile liquid medium, and pre-incubation was performed (1-2 times, 30-37° C., 6-18 h). Thereafter, an appropriate amount (1%) of the strain of the present invention was added to the sterile liquid medium, and inoculated with the pre-culture solution for evaluation (30-37° C., 6-18 h). Subsequently, the absorbance immediately after inoculation and the absorbance during the stationary phase were measured, and the ratio of the values (growth rate) was used as a statistical variable. The growth rates of the experimental group treated with the sample compared to the control group not treated with the sample were compared to determine whether the sample had a significant effect on the growth of bacteria. The evaluation was conducted more than 3-6 times, and after calculating the average value, standard deviation, etc., of the growth rates of N times of the sample, the significance was verified through a t-test.

As a result, it was found that the treatment of the *Lactobacillus pentosus* NIFSLG-1 strain of the present invention enhanced the growth of beneficial bacteria and inhibited the growth of harmful bacteria. The results of prebiotic evaluation are summarized in Table 2 below.

TABLE 2

Evaluation of Prebiotics

| Classification | Enhancement of Beneficial Bacteria (%) | P-value | Inhibition of Harmful Bacteria (%) | P-value | Number of n (Number of repeats) |
|---|---|---|---|---|---|
| *Lactobacillus pentosus* Lysate | 13.1 | 0.040 | −5.1 | 0.057 | 3 times |

Example 6: Evaluation of Nitric Oxide Production Inhibitory Ability

The NO production inhibitory ability of the *Lactobacillus pentosus* NIFSLG-1 strain of the present invention was investigated. Specifically, the nitric oxide (NO) production ability in raw 264.7 mouse macrophages was evaluated for anti-inflammatory efficacy using the GRIESS method. First, the Raw 264.7 cells ($2\times10^5$ cells/well) were dispensed into a 24-well culture plate, cultured in a DMEM medium containing 10% FBS (fetal bovine serum) for 24 hours, and then cultured in a medium without FBS for 12 hours. Subsequently, the strain of the present invention was diluted to a final concentration of 0.1 to 250 ug/mL in a medium without 10% FBS and pretreated for 30 minutes, and added to the cells with LPS (lipopolysaccharide) to a final concentration of 500 ng/ml, and then cultured for 18 hours.

Thereafter, the supernatant was recovered, and the GRIESS reagent was added, followed by reacting at room temperature for 15 minutes, and the absorbance was measured at 540 nm to evaluate the relative NO production and production inhibitory ability.

As a result, when the *Lactobacillus pentosus* lysate of the present invention was treated, the NO production was inhibited in a concentration-dependent manner, confirming that the strain of the present invention had skin inflammation alleviation (skin calming) or anti-inflammatory effects (FIG. 7). The evaluation results of NO production inhibitory ability are summarized in Table 3 below.

TABLE 3

| Inhibition of NO Production | | | | |
|---|---|---|---|---|
| Lactobacillus pentosus lysate Treatment Concentration | | | Inhibition Rate (% control) | STDEV |
| 500 ng/mL | | | 0.0 | 0.008 |
| LPS | L-NMMA | 100 uM | 81.2 | 0.011 |
| | L. pentosus | 0.1 | 4.0 | 0.015 |
| | (ug/mL) | 1 | 0.0 | 0.013 |
| | | 10 | 7.1 | 0.013 |
| | | 100 | 31.9 | 0.007 |
| | | 250 | 58.5 | 0.002 |

Example 7: Evaluation of Melanin Production Inhibitory Ability

The melanin production inhibitory ability (brightening) of the *Lactobacillus pentosus* NIFSLG-1 strain of the present invention was investigated. Specifically, MNT-1 melanoma cells were prepared by adding 10% FBS to DMEM (Dulbecco's Modified Eagle's Medium) as a basal medium. Then, the MNT-1 melanoma cells were seeded in a 6-well plate at a concentration of 1 to $2 \times 10^5$ cells/mL and cultured for 24 hours. Subsequently, the strain of the present invention was treated, and the cells were cultured for 72 hours and then recovered. Then, after centrifugation at 13,000 rpm for 1 minute and removal of the supernatant, 300 μL of a 0.5% Triton X-100 solution was added to the pellet to lyse the cells. Thereafter, centrifugation was performed at 13,000 rpm for 3 minutes, and the pellet and supernatant were recovered. Then, 100 μL of 0.5N NaOH was added to the pellet, and the cells were incubated overnight to dissolve melanin, and then the absorbance at 450 nm was measured using an ELISA reader.

As a result, when MNT-1 melanoma cells were treated with the *Lactobacillus pentosus* lysate of the present invention, the production of melanin was inhibited in a concentration-dependent manner, confirming the skin brightening effect (FIG. 8). The evaluation results of melanin production inhibition are summarized in Table 4 below.

TABLE 4

| Evaluation on Inhibition of Melanin Production | | | |
|---|---|---|---|
| Sample | Concentration | Melanin content (% control) | STDEV |
| CTL | — | 100.00 | 2.85 |
| LP | 0.025 ppm | 99.85 | 3.05 |
| | 0.25 ppm | 89.33 | 6.28 |
| | 2.5 ppm | 84.48 | 8.13 |
| | 25 ppm | 77.14 | 7.85 |
| Arbutin | 200 μg/mL | 74.37 | 3.05 |

Example 8: Evaluation of Collagen Synthesis Effect

The efficacy of collagen synthesis was investigated for the *Lactobacillus pentosus* NIFSLG-1 strain of the present invention. Specifically, after primary culture of skin fibroblasts, DMEM (Dulbecco's Modified Eagle's Medium) with an addition of 10% FBS was used as a basal medium for the skin fibroblasts. Then, the skin fibroblasts were seeded in a 48-well plate at a concentration of 2 to $5 \times 10^4$ cells/mL and cultured for 24 hours. Subsequently, the growth medium was removed, and a medium containing the strain of the present invention (without FBS added) was added, and the cells were cultured for 24 hours, and thereafter the cell culture solution was taken and subjected to ELISA analysis.

As a result, when the skin fibroblasts were treated with the *Lactobacillus pentosus* lysate of the present invention, collagen synthesis was promoted in a concentration-dependent manner, confirming the effects of improving skin wrinkles and enhancing skin elasticity (FIG. 9). The evaluation of collagen synthesis efficacy is summarized in Table 5 below.

TABLE 5

| Evaluation of Collagen Synthesis Effect | | | |
|---|---|---|---|
| Sample | Concentration | Collagen (% control) | STDEV |
| CTL | — | 100.00 | 2.40 |
| Vita C | 100 | 161.91 | 13.49 |
| LP | 0.1 ppm | 102.41 | 6.25 |
| | 1 ppm | 109.64 | 2.67 |
| | 10 ppm | 115.62 | 7.15 |
| | 100 ppm | 129.53 | 2.58 |
| | 250 ppm | 149.75 | 5.33 |

In conclusion, the novel *Lactobacillus* sp. strain of the present invention exhibits antibacterial activity against various pathogenic bacteria, including bacteria associated with fish diseases and dental cavities, has excellent moisturizing effect, has excellent activity to enhance beneficial bacteria and inhibit harmful bacteria, and inhibits the production of melanin, and promotes collagen synthesis, and thus, it can be used as a material for a variety of foods and medicines including probiotics and feed additives.

While the present invention has been particularly shown and described with reference to exemplary embodiments thereof, it will be understood by one of ordinary skill in the art that various changes in form and details may be made therein without departing from the spirit and scope of the present invention as defined by the following claims.

DEPOSITION NO.

Depository Institution: Korean Culture Center of Microorganisms
Accession No.: KCCM12780P
Deposition Date: Aug. 25, 2020

The invention claimed is:

1. A cosmetic composition comprising: an active ingredient comprising a lysate of *Lactobacillus pentosus* NIFSLG-1 strain deposited with Accession No. KCCM12780P; or a culture supernatant of the strain, and a cosmetically acceptable carrier ingredient;
wherein the active ingredient is present in an amount effective for promoting skin collagen synthesis, improving skin wrinkles, alleviating skin inflammation, promoting skin brightening, promoting skin regeneration, improving skin elasticity, calming skin, improving skin moisturization, promoting proliferation of *Staphylococcus epidermidis* on the skin, or inhibiting proliferation of *Staphylococcus aureus* on the skin,
wherein the cosmetic composition is in the form of a solution, a suspension, an emulsion, a paste, a gel, a cream, a lotion, a powder, a soap, a surfactant-containing cleanser, an oil, a powder foundation, an emulsion foundation, a wax foundation, a spray, or a mixture thereof, and
wherein when the cosmetic composition is in the form of a solution, the solution comprises an organic solvent.

2. The cosmetic composition of claim 1, wherein the cosmetic composition is in the form of a solution, a suspension, an emulsion, an emulsion foundation, an oil, a spray, or a mixture thereof.

3. The cosmetic composition of claim 1, wherein the cosmetic composition is in the form of a paste, a gel, a cream, or a lotion.

4. The cosmetic composition of claim 1, wherein the cosmetic composition is in the form of a powder or a powder foundation.

5. The cosmetic composition of claim 1, wherein the cosmetic composition is in the form of a soap, or a surfactant-containing cleanser.

6. The cosmetic composition of claim 1, wherein the cosmetic composition is in the form of a wax foundation.

7. The cosmetic composition of claim 1, wherein the formulation of the composition further comprises an emulsifier or a wax.

8. The cosmetic composition of claim 1, wherein the active ingredient is present in an amount from 0.1 μg/mL to 250 μg/mL.

9. The cosmetic composition of claim 1, wherein the active ingredient is present in an amount from 0.025 ppm to 25 ppm.

10. The cosmetic composition of claim 1, wherein the active ingredient is present in an amount from 0.1 ppm to 250 ppm.

\* \* \* \* \*